United States Patent
Yu et al.

(10) Patent No.: US 7,551,379 B2
(45) Date of Patent: Jun. 23, 2009

(54) WRITE ELEMENT BEFORE READ ELEMENT WITH EARLY SERVO TERMINATION ON WRITE

(75) Inventors: Mantle Yu, San Jose, CA (US); Bernd Lamberts, Cupertino, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 147 days.

(21) Appl. No.: 11/545,830

(22) Filed: Oct. 10, 2006

(65) Prior Publication Data

US 2008/0084629 A1   Apr. 10, 2008

(51) Int. Cl.
   *G11B 5/09* (2006.01)
(52) U.S. Cl. .............................. 360/51; 360/21; 360/62; 360/77.06
(58) Field of Classification Search .................. None
   See application file for complete search history.

(56) References Cited

U.S. PATENT DOCUMENTS

| | | | |
|---|---|---|---|
| 5,600,501 A * | 2/1997 | Yamakoshi et al. ........... 360/51 |
| 5,760,983 A | 6/1998 | Cowen | |
| 5,940,250 A * | 8/1999 | McNeil et al. ........... 360/246.6 |
| 6,061,201 A * | 5/2000 | Woods ..................... 360/77.06 |
| 6,097,565 A | 8/2000 | Sri-Jayantha et al. | |
| 6,185,059 B1 * | 2/2001 | Buch et al. ..................... 360/51 |
| 6,219,194 B1 | 4/2001 | Stein et al. | |
| 6,320,718 B1 * | 11/2001 | Bouwkamp et al. ...... 360/77.04 |
| 6,577,462 B1 * | 6/2003 | Hamada et al. ................ 360/51 |
| 6,714,369 B2 * | 3/2004 | Miles ........................... 360/51 |
| 6,781,786 B2 * | 8/2004 | Ishii ......................... 360/78.04 |
| 6,882,508 B2 | 4/2005 | Yamaguchi et al. | |
| 6,950,259 B2 * | 9/2005 | Osafune ....................... 360/51 |
| 7,006,316 B1 * | 2/2006 | Sargenti et al. ............... 360/51 |
| 7,106,534 B2 * | 9/2006 | Yoshida et al. ................ 360/51 |
| 2003/0002190 A1 * | 1/2003 | Teo et al. ...................... 360/63 |
| 2003/0147166 A1 | 8/2003 | Hetzler et al. | |
| 2004/0190174 A1 * | 9/2004 | Yoshida et al. ................ 360/51 |
| 2005/0057837 A1 | 3/2005 | Takamatsu et al. | |
| 2005/0174671 A1 * | 8/2005 | Dunn et al. .................... 360/48 |
| 2006/0056093 A1 * | 3/2006 | Ehrlich et al. ................. 360/75 |

* cited by examiner

*Primary Examiner*—Hoa T Nguyen
*Assistant Examiner*—Dismery E Mercedes
(74) *Attorney, Agent, or Firm*—Townsend and Townsend and Crew LLP; Patrick Duncan (57) ABSTRACT

Embodiments of the present invention provide a magnetic disk drive system in which the write element leads the read element in the tangential direction of rotation of the magnetic disk. In addition, the servo sector information is preferably arranged such that information that is not needed for write operation is placed at the end of the servo sector. In this way, the servo read operation can be terminated sooner and the write operation can initiate sooner after going over the servo sector. The write element in a write operation writes data to the data sector of a track until an end of the data sector before reaching a front end of a servo sector following the end of the data sector. The read element reads information in the servo sector needed for the write operation. The write element starts writing data in a next data sector following the servo sector after the write element reaches the next data sector and after the read element has read all information in the servo sector needed for the write operation.

22 Claims, 7 Drawing Sheets

WRITE ELEMENT BEFORE READ ELEMENT WITH EARLY SERVO TERMINATION ON WRITE

CROSS-REFERENCES TO RELATED APPLICATIONS

NOT APPLICABLE

BACKGROUND OF THE INVENTION

This invention relates generally to magnetic disk drive systems and, more particularly, to a magnetic disk drive system in which the write element leads the read element in the tangential direction of rotation of the magnetic disk.

Figure 1A:
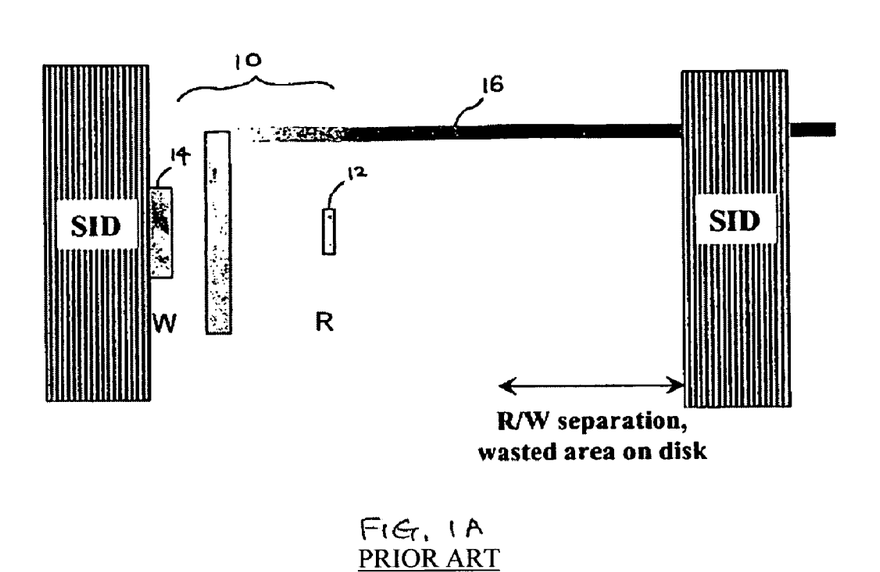
FIGS. 1A and 1B are simplified diagrams showing movement of a conventional read/write head in which the read element leads the write element to illustrate a gap that determines when to terminate the write process before the read head reaches the servo wedge.
Figure 1B:
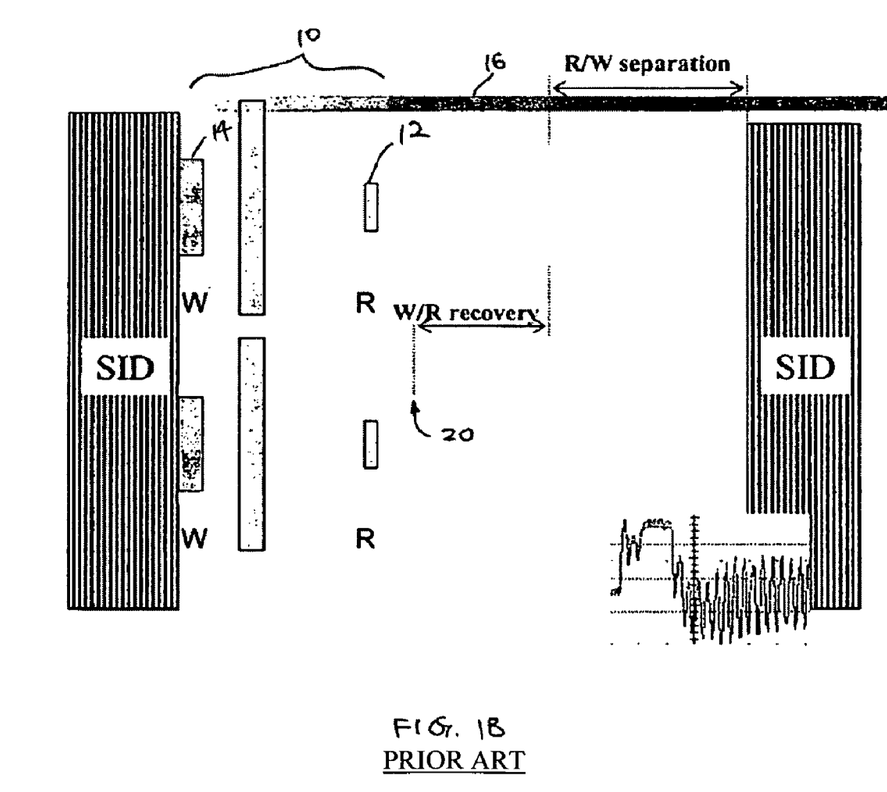

A typical read/write head in a hard disk drive consists of a read element that leads a write element in the tangential direction of rotation of the magnetic disk. The read head goes over a particular part of the rotating disk before the write head. During customer write operation, the write process must terminate before the read head reaches the servo wedge leaving a gap equals to the length of the read to write head distance. The read element and the write element cannot both be operated at the same time due to magnetic and electrical noise and interaction. Moreover, an additional gap must be added to allow time for the disturbance to decay due to switching from write mode to read mode, known as write to read recovery. As seen in the read/write head 10 of FIG. 1, a read head 12 leads the write head 14 in the tangential direction 16 over the magnetic disk. In FIG. 1A, the write head 14 has just gone over the previous servo wedge or servo identification (SID) region. As the head 10 moves across the data sector, the write head 14 must terminate at location 20 to allow time for the disturbance due to switching to decay (W/R recovery) and to leave a gap equal to the length of the read to write head distance (R/W separation), as seen in FIG. 1B. See, e.g., U.S. Pat. Nos. 5,760,983 and 6,219,194, and U.S. Patent Publication No. 2005/0057837. The total gap represents a loss of area for write operation, and can typically be as much as 30-50% of the total servo overhead. The overall sequential data rate is reduced by the same amount due to this gap.

BRIEF SUMMARY OF THE INVENTION

Embodiments of the present invention provide a magnetic disk drive system in which the write element leads the read element in the tangential direction of rotation of the magnetic disk. In addition, the servo wedge information is preferably arranged such that information that is not needed for write operation is placed at the end of the servo wedge. In this way, the servo read operation can be terminated sooner and the write operation can initiate sooner after going over the servo wedge.

In accordance with an aspect of the present invention, a disk drive comprises a disk including a plurality of tracks each having a plurality of data sectors spaced by servo sectors, the disk configured to rotate in a circumferential direction of the tracks; a magnetic head having a write element to write data to the tracks and a read element to read data from the tracks, the write element being disposed in front of the read element against the circumferential direction of rotation of the disk so that the write element goes over a location on a track before the read element; and a processor configured to control the write element of the magnetic head in a write operation to write data to the data sector of a track until an end of the data sector before reaching a front end of a servo sector following the end of the data sector, to control the read element of the magnetic head to read information in the servo sector needed for the write operation, and to control the write element to start writing data in a next data sector following the servo sector after the write element reaches the next data sector and after the read element has read all information in the servo sector needed for the write operation.

In some embodiments, the write element is separated from the read element by a read/write separation gap; a write to read recovery is needed for disturbance to decay due to switching from write mode to read mode before the read element starts reading information in the servo sector after the write element stops writing in the data sector; and the write to read recovery is equal to or smaller than the read/write separation gap to allow time for disturbance to decay due to switching from write mode to read mode so as to provide write to read recovery. The magnetic head is disposed at a skew angle with respect to a tangent of the track so that the read/write separation gap is disposed at the skew angle with the tangent of the track, and wherein the processor is configured to employ an adaptive formatting technique to account for effect of the skew angle in ensuring that the write to read recovery is equal to or smaller than the read/write separation gap.

In some embodiments, the write element is separated from the read element by a read/write separation gap; a write to read recovery is needed for disturbance to decay due to switching from write mode to read mode before the read element starts reading information in the servo sector after the write element stops writing in the data sector; the write to read recovery is larger than the read/write separation gap by a recovery difference; and the processor is configured to control the write element to stop writing before reaching the end of the data sector by a space from the end of the data sector which is equal to or larger than the recovery difference so as to allow time for disturbance to decay due to switching from write mode to read mode. The magnetic head is disposed at a skew angle with respect to a tangent of the track so that the read/write separation gap is disposed at the skew angle with respect to the tangent of the track, and wherein the processor is configured to employ an adaptive formatting technique to account for effect of the skew angle in comparing the read/write separation gap with the write to read recovery in controlling the write element to stop writing in the data sector to allow time for disturbance to decay due to switching from write mode to read mode.

In specific embodiments, servo information in the servo sector is arranged such that information that is not needed for write operation is placed at a back end region of the servo sector. The information that is not needed for write operation includes one or more of cylinder address bit(s), read repeatable runout field, and part of a fine position tracking signal not necessary for write operation. If the size of the back end region is equal to or larger than the read/write separation gap, and wherein the processor is configured to control the write element to start writing in the next data sector substantially immediately after going over the back end of the servo sector so as to eliminate delay due to the read/write separation gap. If the size of the back end region is smaller than the read/write separation gap, and wherein the processor is configured to control the write element to start writing in the next data sector substantially immediately after the read element enters the back end region so as to reduce delay due to the read/write separation gap by an amount equal to the size of the back end region. The magnetic head is disposed at a skew angle with respect to a tangent of the track so that the read/write separation gap is disposed at the skew angle with respect to the back end region of the servo sector, and wherein the processor is configured to employ an adaptive formatting technique to account for effect of the skew angle in comparing the read/write separation gap with the size of the back end region for controlling the write element to start writing in the next data sector.

Another aspect of the invention is directed to a method of performing a write operation for a disk drive which includes a disk including a plurality of tracks each having a plurality of data sectors spaced by servo sectors, the disk configured to rotate in a circumferential direction of the tracks; and a magnetic head having a write element to write data to the tracks and a read element to read data from the tracks, the write element being disposed in front of the read element against the circumferential direction of rotation of the disk so that the write element goes over a location on a track before the read element. The method comprises controlling the write element of the magnetic head in a write operation to write data to the data sector of a track until an end of the data sector before reaching a front end of a servo sector following the end of the data sector; controlling the read element of the magnetic head to read information in the servo sector needed for the write operation; and controlling the write element to start writing data in a next data sector following the servo sector after the write element reaches the next data sector and after the read element has read all information in the servo sector needed for the write operation.

Another aspect of the invention is directed to a computer readable storage medium including a computer code for operating a disk drive which includes a disk including a plurality of tracks each having a plurality of data sectors spaced by servo sectors, the disk configured to rotate in a circumferential direction of the tracks; and a magnetic head having a write element to write data to the tracks and a read element to read data from the tracks, the write element being disposed in front of the read element against the circumferential direction of rotation of the disk so that the write element goes over a location on a track before the read element. The computer code comprises code for controlling the write element of the magnetic head in a write operation to write data to the data sector of a track until an end of the data sector before reaching a front end of a servo sector following the end of the data sector; code for controlling the read element of the magnetic head to read information in the servo sector needed for the write operation; and code for controlling the write element to start writing data in a next data sector following the servo sector after the write element reaches the next data sector and after the read element has read all information in the servo sector needed for the write operation.

DETAILED DESCRIPTION OF THE INVENTION

Figure 2A:
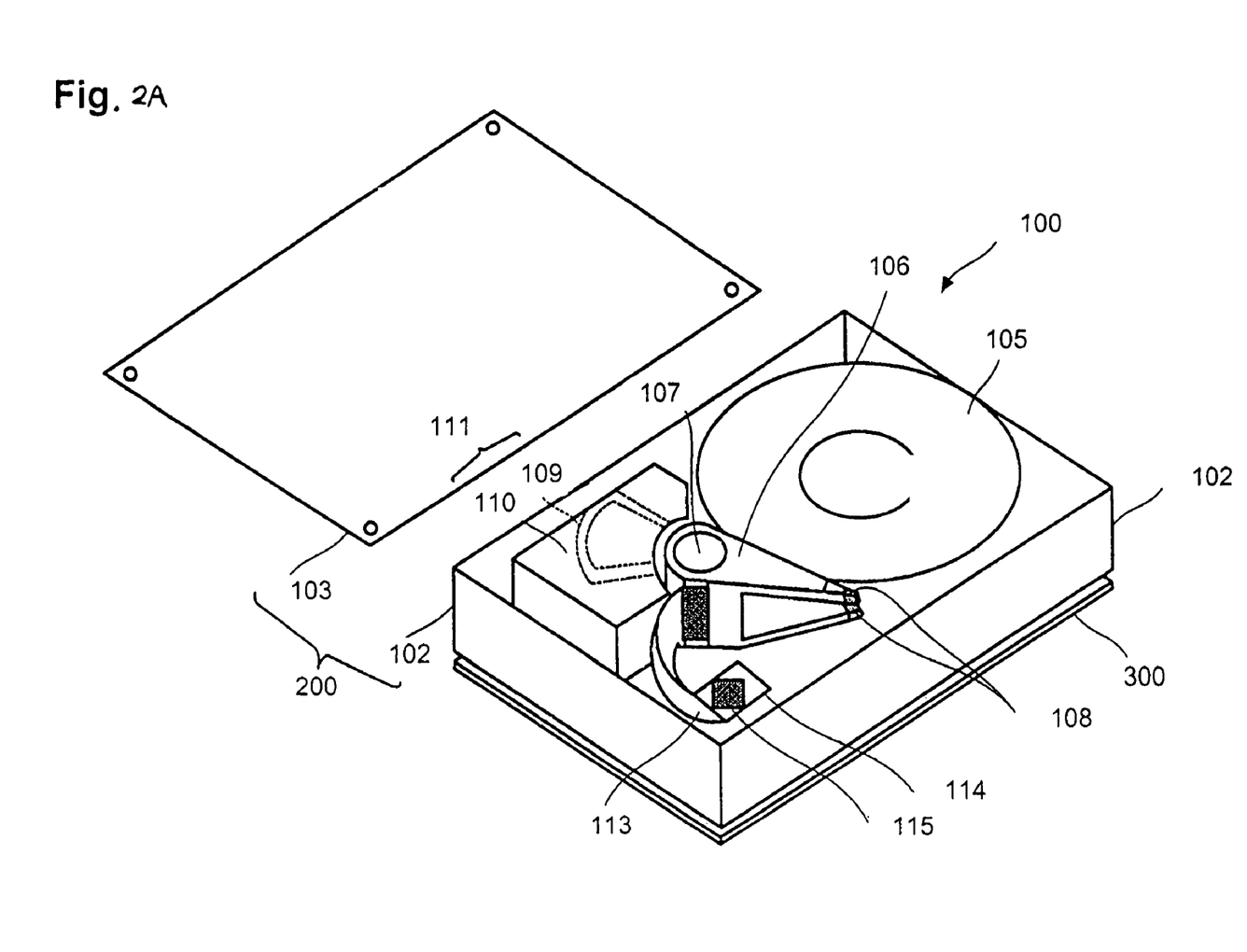
FIG. 2A is an exemplary simplified perspective view of a hard disk drive (HDD) that can be used as a data storage device within computing device according to an embodiment of the present invention.
Figure 2B:
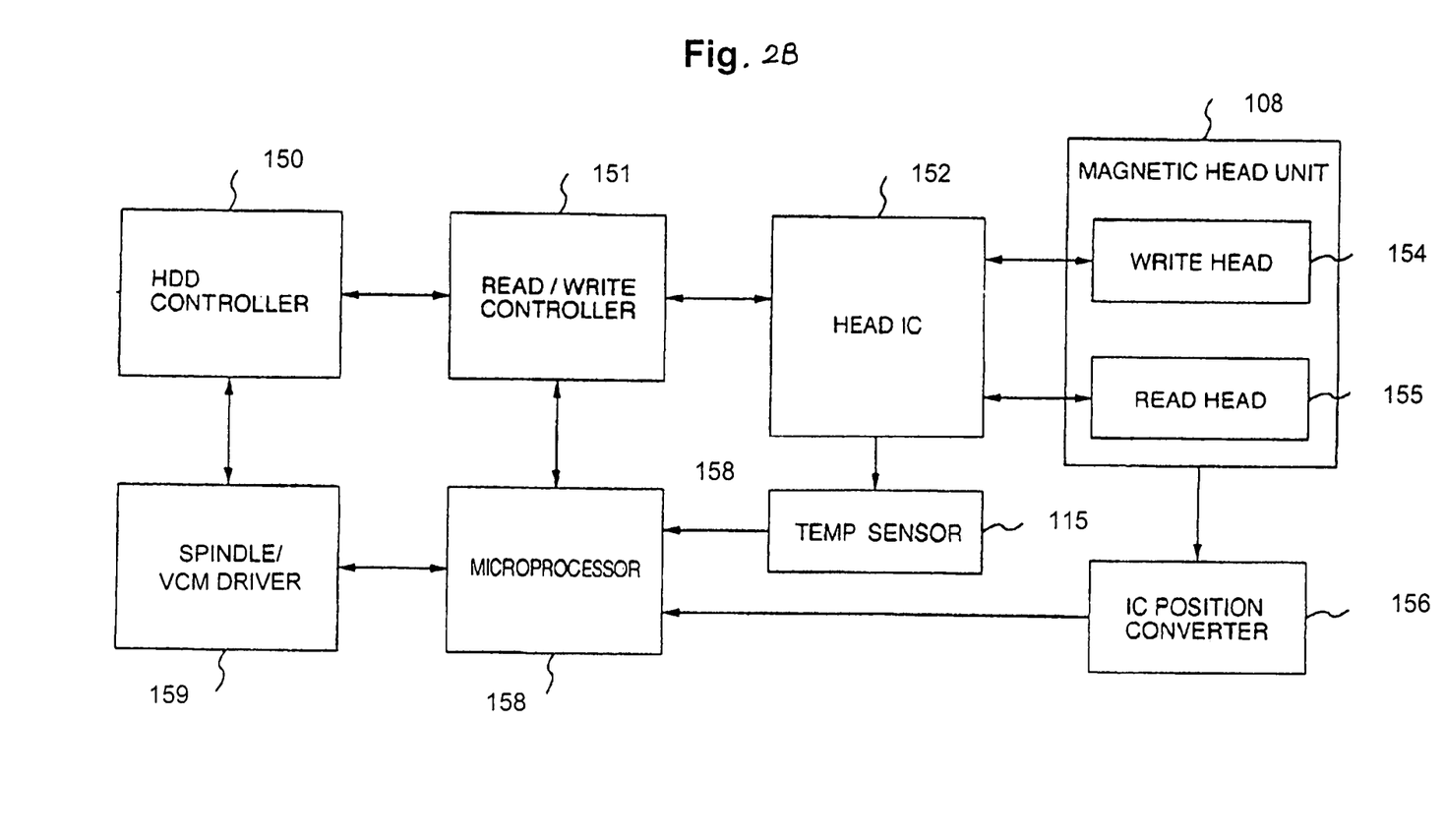
FIG. 2B is an exemplary simplified functional block diagram of the HDD according to an embodiment of the present invention.

FIG. 2A shows is an exemplary simplified perspective view of a hard disk drive (HDD) 100 that may incorporate the read/write head of the present invention according to an embodiment of the present invention. FIG. 2B is an exemplary simplified functional block diagram of the HDD according to an embodiment of the present invention. As shown in FIG. 2A, the HDD 100 includes a disk enclosure 200 having a top cover 103 installed to seal the open top of a box-shaped base 102, which may be made, for instance, of an aluminum alloy. The top cover 103 is made, for instance, of stainless steel, and is fastened by fasteners to the base 102 with a sealing member (not shown), which is shaped like a rectangular frame. The disk enclosure 200 contains a spindle motor (not shown), which comprises, for instance, a hub-in, three-phase DC servo motor. The spindle motor imparts rotary drive to a magnetic disk 105, which is a storage medium. One or more units of the magnetic disk 105 are installed in compliance with the storage capacity requirements for the HDD 100. A card 300 is attached to the lower surface of base 102. The card 300 carries a signal processing circuit, a drive circuit for spindle motor, and other components described later.

An actuator arm 106 is mounted within the disk enclosure 200. The middle section of the actuator arm 106 is supported above the base 102 so that it can pivot on a pivot axis 107. A composite magnetic head 108 is mounted on one end of the actuator arm 106. A VCM (voice coil motor) coil 109 is mounted on the remaining end of the actuator arm 106. The VCM coil 109 and a stator 110, which is made of a permanent magnet and fastened to the disk enclosure 200, constitute a VCM 111. When a VCM current flows to the VCM coil 109, the actuator arm 106 can move to a specified position over the magnetic disk 105. This movement causes the composite magnetic head 108 to perform a seek operation. The magnetic disk 105 is driven to rotate around a spindle axis of the spindle motor. When HDD 100 does not operate, the magnetic disk 105 comes to a standstill.

As seen in FIG. 2A, the composite magnetic head unit 108 may be a combination of an ILS (integrated lead suspension) (not shown), a read head 155, which comprises a GMR (giant magnetoresistive) sensor, and a write head 154, which comprises an induction-type converter. The read head 155 reads servo information when the head unit 108 reads data, writes data, or performs a seek operation. For a data read operation, the read head 155 also reads data between items of servo information. For a data write or data read, the actuator arm 106 pivots over the surface of the magnetic disk 105 during its rotation so that the composite magnetic head unit 108 performs a seek operation to scan for an arbitrary track on the magnetic disk 105. In this instance, the ABS (air bearing surface) of composite magnetic head unit 108, which faces the magnetic disk 105, receives a lift force due to an air current generated between the ABS and the magnetic disk 105. As a result, the composite magnetic head unit 108 constantly hovers a predetermined distance above the surface of the magnetic disk 105.

The read head 155 and write head 154, which constitute the composite magnetic head unit 108, are electrically connected to the head IC 152. The head IC 152 is mounted on a lateral surface of the pivot axis 107 of the actuator arm 106. One end of a flex cable 113 is connected to the head IC 152 to permit data exchange with the card 300. A connector 114 is attached to the remaining end of the flex cable 113 for connecting to the card 300. A temperature sensor 115 may be mounted on the upper surface of the connector 114 to measure the temperature inside the disk enclosure 200 (the ambient temperature for the magnetic disk 105).

The card 300 includes electronic circuits shown in FIG. 2B, which control the operation of the actuator arm 106 and perform data read/write operations in relation to the magnetic disk 105. The card 300 controls the rotation of the magnetic disk 105 through a spindle/VCM driver 159 and drives the VCM coil 109 to control the seek operation of the actuator arm 106.

The HDD controller 150 transfers data between an external host (not shown) and the magnetic disk 105, generates a position error signal (PES) from servo data, and transmits the positional information about the composite magnetic head 108 to a read/write controller 151 and a microprocessor 158. In accordance with the control information from the microprocessor 158, the spindle/VCM driver 159 drives the VCM coil 109 to position the composite magnetic head 108 on the specified track. The positioning of the magnetic head unit 108 is determined by an IC position converter 156 in response to a signal from the magnetic head unit 108. The microprocessor 158 further interprets a command that is transmitted from an external host (not shown) through the HDD controller 150, and instructs the HDD controller 150 to perform a data read/write operation in relation to an address specified by the command. In accordance with the positional information about the composite magnetic head 108, which is generated by the HDD controller 150, the microprocessor 158 also transmits control information to the spindle/VCM driver 159 for the purpose of performing a seek operation to position composite magnetic head 108 on a specified track.

Figure 3:
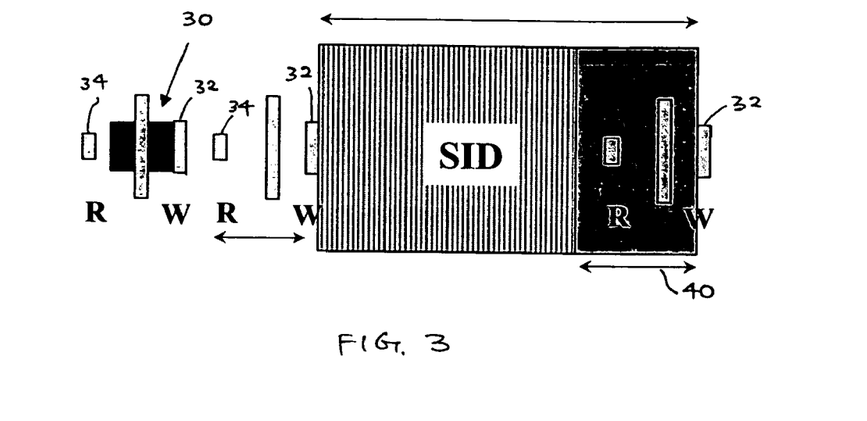
FIG. 3 is a simplified diagram showing movement of a read/write head in which the write element leads the read element to illustrate the elimination or reduction of the gap required in the prior art according to an embodiment of the present invention.

FIG. 3 shows a read/write head 30 in which the write element 32 leads the read element 34. In the data region or data sector leading up to the next servo sector or servo wedge or ID (SD) region, the R/W separation gap in the data sector immediately preceding the servo wedge is eliminated because there is no need to terminate the write operation before the read head reaches the servo wedge (front end of the servo wedge). Because the write operation in the data sector terminates as the write element reaches the servo sector, there is extra time due to the R/W separation gap before the read element passes over the servo sector. The R/W separation gap is typically large enough to allow time for disturbance to decay due to switching from write mode to read mode or write to read (W/R) recovery. As a result, the W/R recovery time can be hidden. After going over the servo wedge, the write operation by the write element 32 in the data sector immediately following the servo wedge (back end of the servo wedge) does not start until the read element 34 completes reading in the servo wedge, so that the R/W separation gap of delay in the write operation remains. In this configuration, the additional delay due to W/R recovery is eliminated provided that the it is shorter than or equal to the R/W separation gap. If the W/R recovery is longer than the R/W separation gap, the W/R recovery is not eliminated but is still reduced by an amount equal to the size of the R/W separation gap. This reduces the loss of area for write operation.

To further eliminate or reduce delay in the write operation due to the R/W separation gap, the servo wedge information is arranged such that information that is not needed for write operation is placed at a back end region 40 of the servo wedge, as seen in FIG. 3. If the size of the back end region 40 is equal to or larger than the R/W separation gap, write operation by the write element 32 can start immediately after going over the back end of the servo wedge so as to eliminate the delay due to the R/W separation gap. If the size of the back end region 40 is smaller than the R/W separation gap, write operation by the write element 32 can start as soon as the read element 34 enters the back end region 40 so as to reduce the delay due to the R/W separation gap by an amount equal to the size of the back end region 40.

Examples of information in the servo wedge not needed for write operation include cylinder ID, read repeatable runout (RRO) field, part of fine tracking signal not necessary for write operation, and the like. As described in U.S. Patent Publication No. 2005/0057837A1, a burst area is information to indicate the relative position of the current location of the head to the track center, while a recording area to write eccentricity correction data in the servo frame is referred to as a post code area. The RRO data is after the PES burst. See also U.S. Pat. No. 6,097,565 at FIG. 5 (57) and FIG. 5A (62). The read RRO is not used during write operation, but only during read operation. The magnetic head can stop the read operation of the read RRO field located after the servo burst early and get ready for the write operation to the data area earlier.

Figure 4:
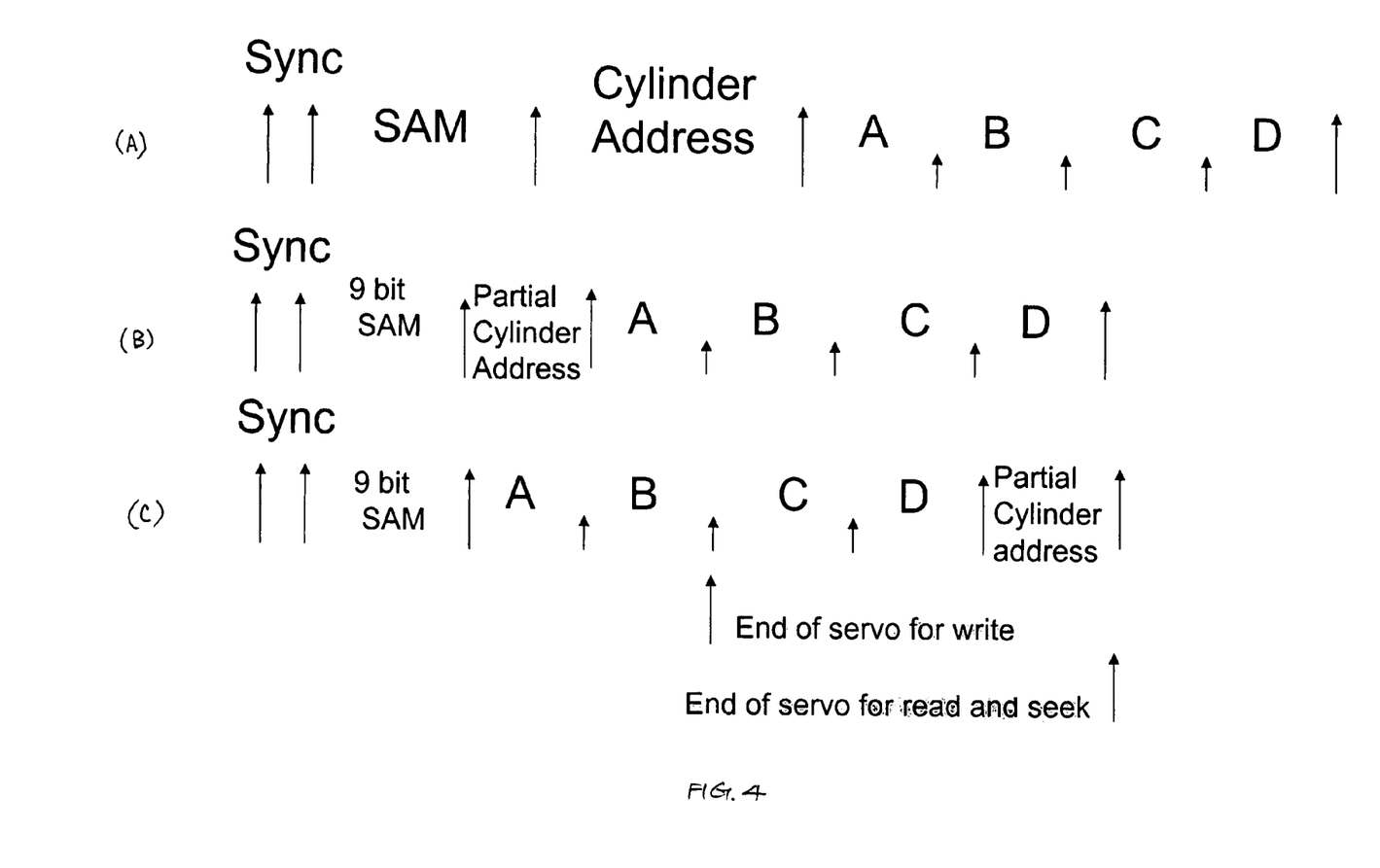
FIGS. 4A-4C are simplified diagrams showing one example of rearranging the servo sector information such that information that is not needed for write operation is placed at a back end region of the servo sector.

FIG. 4 shows an example of rearranging the servo wedge information such that information that is not needed for write operation is placed at a back end region of the servo wedge. FIG. 4A shows the original arrangement of the servo wedge information involving a quad burst. In FIG. 4B, the servo address mark (SAM) is reduced in the number of bits (to 9 bits in the example), and the cylinder address is replaced by a partial cylinder address to further reduce the size of the servo sector. In FIG. 4C, the partial cylinder address is moved to the back end of the servo sector. In this example, the partial cylinder address and quad bursts C and D are not needed for the write operation. The partial cylinder address is used for read and seek, but not for track following. The quad bursts C and D are part of the fine position tracking signal not necessary for the write operation. Thus, the end of servo for write is located between quad burst B and quad burst C, while the end of servo for read and seek is located at the back end of the servo sector.

According to the present technique employing a write element before the read element and arranging the servo information in the servo sector, the loss of area for write operation (extra overhead) in the prior art (R/W separation and W/R recovery) can be reduced or eliminated. In a typical example, the W/R recovery field is about 20% of the servo overhead, and R/W offset is about 40% of the servo overhead. If the servo sectors occupy 10% of the disk surface, this approach of reducing or eliminating the extra overhead can potentially save about 6% of the total area or "real estate" for write operation. Additional saving can be achieved by having better format efficiency due to smaller servo overhead.

Figure 5:
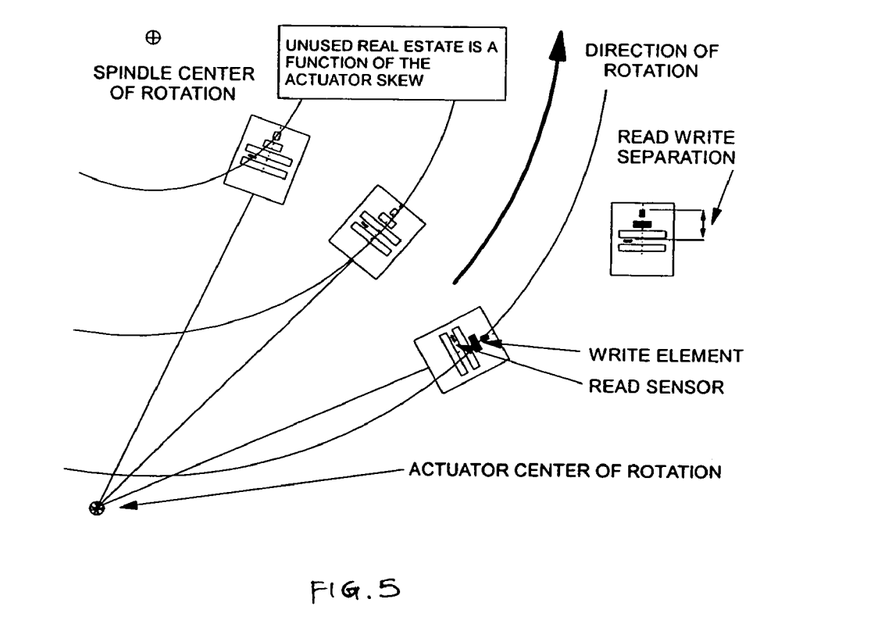
FIG. 5 is a simplified diagram showing the skew angle for a conventional magnetic head with the read element disposed before the write element.

The gap between the read element and the write element is a fixed geometric quantity, but the offset which is actually required is a function of the applied skew angle, and hence the radial position, of the magnetic head. The skew angle is illustrated in FIG. 5 for a conventional magnetic head with the read element disposed before the write element. The positions of the read element and the write element are reversed in the present invention. Referring back to FIG. 3, the additional delay due to W/R recovery is eliminated provided that the it is shorter than or equal to the R/W separation gap; whereas if the W/R recovery is longer than the R/W separation gap, the W/R recovery is not eliminated but is still reduced by an amount equal to the size of the R/W separation gap. This does not take into account the skew angle of the magnetic head with respect to the tracks on the disk. This does not present an issue if the W/R recovery is sufficiently smaller than the R/W separation gap. Otherwise, the adaptive formatting technique can be used to account for the effect of the skew angle. Similarly, referring back to FIG. 3 above, if the back end region 40 is equal to or larger than the R/W separation gap, write operation by the write element 32 can start immediately after going over the back end of the servo wedge so as to eliminate the delay due to the R/W separation gap; whereas if the back end region 40 is smaller than the R/W separation gap, write operation by the write element 32 can start as soon as the read element 34 enters the back end region 40 so as to reduce the delay due to the R/W separation gap by an amount equal to the size of the back end region 40. This does not take into account the skew angle of the magnetic head with respect to the tracks on the disk. This does not present an issue if the back end region 40 is sufficiently larger than the R/W separation gap. Otherwise, the adaptive formatting technique can be used to account for the effect of the skew angle.

The adaptive formatting technique is described, for instance, in U.S. Pat. No. 6,781,786 and U.S. Patent Publication No. 2005/017671A1, the entire disclosures of which are incorporated herein by reference.

Figure 6:
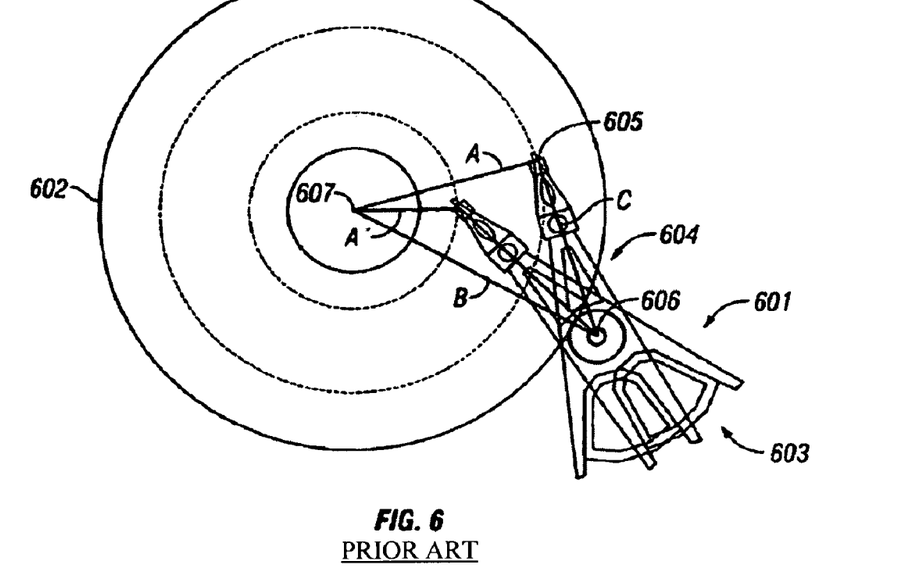
FIG. 6 is a schematic diagram showing the physical arrangement of a rotary actuator of a hard disk drive in relationship to a hard disk.

For example, U.S. Patent Publication No. 2005/017671A1 discloses writing a data track having a length that is based on an arc of the rotary actuator, the radial position of the read/write head with respect to the hard disk, and the offset between the read element and the write element. FIG. 6 depicts a detailed physical arrangement of a rotary actuator 601 of a hard disk drive in relationship to a hard disk 602. In FIG. 6, the rotary actuator 601 includes an actuator end 603 that is integral with a voice coil motor, an actuator arm 604, and an offset read/write head 605 that is located distal from the actuator end 603. The hard disk 602 rotates counter-clockwise in FIG. 6. As the rotary actuator 601 is driven by the voice coil motor, the rotary actuator 601 pivots around a pivot point 606. The rotary actuator 601 is depicted in FIG. 6 with the read/write head 605 in a first position at a radius A from the center of the hard disk 602 and with the read/write head 605 in a second position at a radius A' from the center of the hard disk 602. A distance B is the distance between the pivot 606 and the center 607 of the hard disk 602. A distance C is the distance between the pivot 606 and the read head sensor 605.

Figure 7:
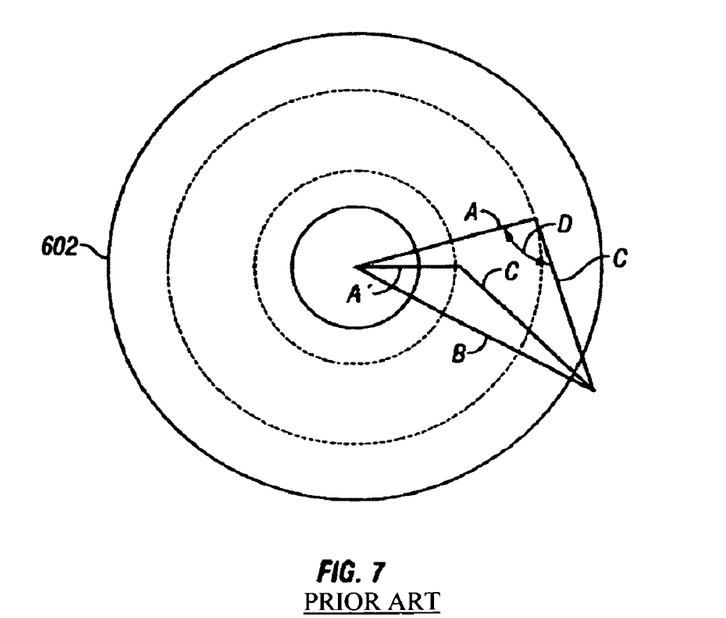
FIG. 7 is a diagram of the physical arrangement of FIG. 6 with the rotary actuator removed.

FIG. 7 depicts the physical arrangement of the rotary actuator 601 and the hard disk 602, shown in FIG. 6, with the rotary actuator 601 removed. As the rotary actuator 601 pivots around the pivot 606, the radius A changes while the distances B and C remain constant. The cosine of an angle D is given by:

$$\cos D = \frac{A^2 + C^2 - B^2}{2AC}.$$

Figure 8:
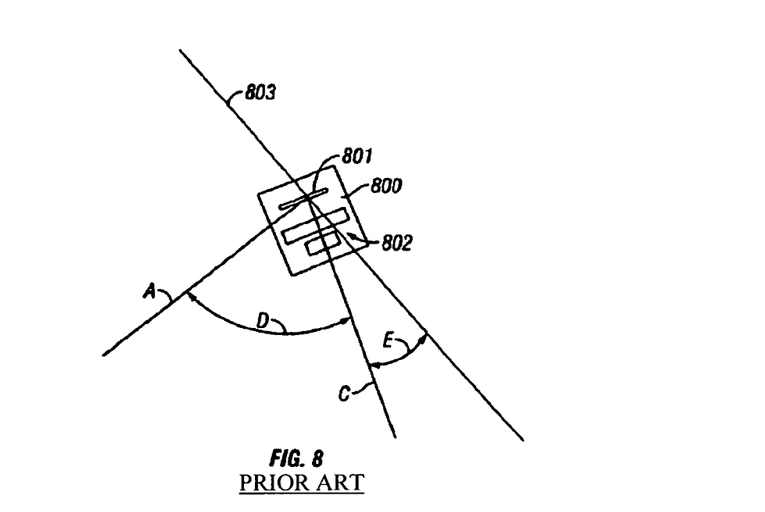
FIG. 8 is a schematic diagram showing the physical arrangement used for determining the angle of a read/write head with respect to a circumferential data track at a given radius.

FIG. 8 depicts the physical arrangement used for determining an angle E of a read/write head 801 with respect to a circumferential data track 803 at a given radius A. The read/write head 801 includes a read element 801 and a write element 802. To adapt this technique to the present invention, the positions of the read element and the write element will be reversed. The angle E is given by $$E=90°-D.$$

Figure 9:
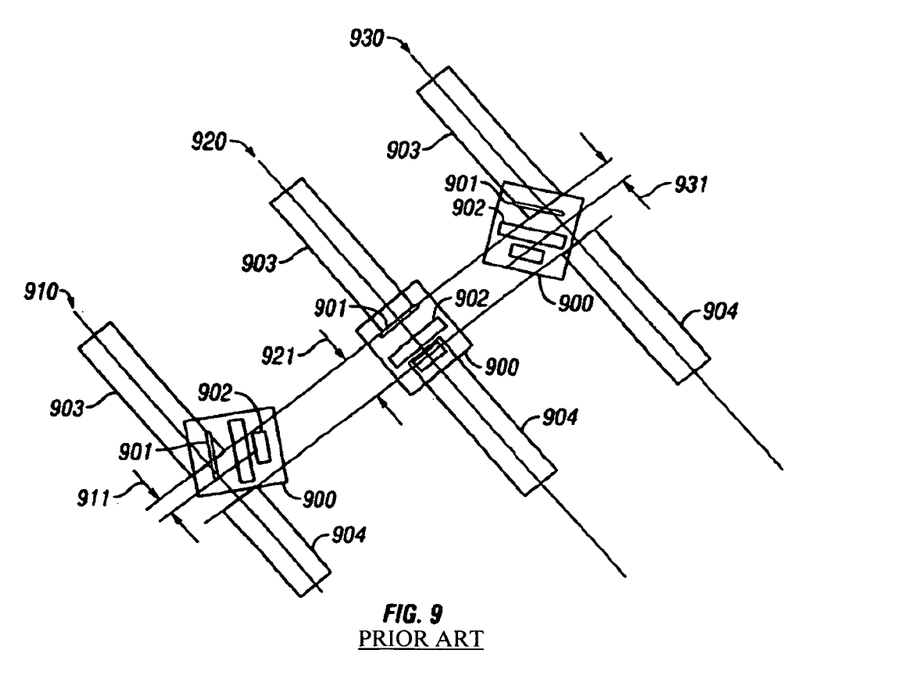
FIG. 9 is a schematic diagram showing that the spacing loss decreases at the outer and inner diameters of a hard disk.

The effective read/write separation gap along the circumferential track decreases at the outer and inner diameters of a hard disk due to effect of the skew angle, as illustrated in FIG. 9. A read/write head 900 having a read element 901 and a write element 902 is depicted near the inner diameter 910, at zero skew 920 (i.e., E=0°) and near the outer diameter 930 of a hard disk with respect to a servo sample (servo sector) 903 and customer data (data sector) 904. Near the inner diameter 910 and near the outer diameter 930, the respective separations 911 and 931 between the read element 901 and the write element 902 are reduced in comparison to separation 921 when the read/write head 900 is at zero skew 920. It is noted that FIG. 9 shows the read element leading the write element, and that the positions of the read element and the write element will be reversed in the present invention.

Due to the skew angles at the inner and outer diameters, the effective read/write separation gaps along the circumferential track are smaller as compared to the write to read recovery. As a result, the adaptive formatting technique can be used to account for the effect of the skew angle to ensure that either the write to read recovery is equal to or smaller than the effective read/write separation gap, or the write operation ends sufficiently early before reading begins in the servo sector to allow time for the write to read recovery.

Similarly, owing to the skew angles at the inner and outer diameters, the effective read/write separation gaps along the circumferential track are smaller as compared to the back end portion of the servo sector. If the read/write separation gap at zero skew angle is equal to or smaller than the size of the back end portion, the effective read/write separation gaps at other skew angles would be smaller than the size of the back end portion, so that writing operation can start at the beginning of the next data sector. Even if the read/write separation gap at zero skew angle is larger than the size of the back end portion, the effective read/write separation gaps at other skew angles may become equal to or smaller than the size of the back end portion, so that writing operation can start sooner, for instance, at the inner and outer diameters. Therefore, the adaptive formatting technique can be used to account for the effect of the skew angle so as to start the write operation sooner at the inner and outer diameters as compared to the zero skew angle.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:

a disk including a plurality of tracks each having a plurality of data sectors spaced by servo sectors, the disk configured to rotate in a circumferential direction of the tracks;

a magnetic head having a write element to write data to the tracks and a read element to read data from the tracks, the write element being disposed in front of the read element against the circumferential direction of rotation of the disk so that the write element goes over a location on a track before the read element; and a processor configured to control the write element of the magnetic head in a write operation to write data to the data sector of a track until an end of the data sector before reaching a front end of a servo sector following the end of the data sector, to control the read element of the magnetic head to read information in the servo sector needed for the write operation, and to control the write element to start writing data in a next data sector following the servo sector after the write element reaches the next data sector and after the read element has read all information in the servo sector needed for the write operation;

wherein the write element is separated from the read element by a read/write separation gap;

wherein a write to read recovery is needed for disturbance to decay due to switching from write mode to read mode before the read element starts reading information in the servo sector after the write element stops writing in the data sector;

wherein the write to read recovery is larger than the read/write separation gap by a recovery difference; and wherein the processor is configured to control the write element to stop writing before reaching the end of the data sector by a space from the end of the data sector which is equal to or larger than the recovery difference so as to allow time for disturbance to decay due to switching from write mode to read mode.

2. The disk drive of claim 1, wherein the write element is separated from the read element by a read/write separation gap;

wherein a write to read recovery is needed for disturbance to decay due to switching from write mode to read mode before the read element starts reading information in the servo sector after the write element stops writing in the data sector;

wherein the write to read recovery is equal to or smaller than the read/write separation gap to allow time for disturbance to decay due to switching from write mode to read mode so as to provide write to read recovery.

3. The disk drive of claim 1 wherein the magnetic head is disposed at a skew angle with respect to a tangent of the track so that the read/write separation gap is disposed at the skew angle with the tangent of the track, and wherein the processor is configured to employ an adaptive formatting technique to account for effect of the skew angle in ensuring that the write to read recovery is equal to or smaller than the read/write separation gap.

4. The disk drive of claim 1 wherein the magnetic head is disposed at a skew angle with respect to a tangent of the track so that the read/write separation gap is disposed at the skew angle with respect to the tangent of the track, and wherein the processor is configured to employ an adaptive formatting technique to account for effect of the skew angle in comparing the read/write separation gap with the write to read recovery in controlling the write element to stop writing in the data sector to allow time for disturbance to decay due to switching from write mode to read mode.

5. The disk drive of claim 1 wherein servo information in the servo sector is arranged such that information that is not needed for write operation is placed at a back end region of the servo sector.

6. The disk drive of claim 5 wherein the information that is not needed for write operation includes one or more of cylinder address bit(s), read repeatable runout field, and part of a fine position tracking signal not necessary for write operation.

7. The disk drive of claim 5, wherein if a size of the back end region is equal to or larger than the read/write separation gap, then the processor is configured to control the write element to start writing in the next data sector substantially immediately after going over the back end of the servo sector so as to eliminate delay due to the read/write separation gap; and wherein if a size of the back end region is smaller than the read/write separation gap, then the processor is configured to control the write element to start writing in the next data sector substantially immediately after the read element enters the back end region so as to reduce delay due to the read/write separation gap by an amount equal to the size of the back end region.

8. The disk drive of claim 7 wherein the magnetic head is disposed at a skew angle with respect to a tangent of the track so that the read/write separation gap is disposed at the skew angle with respect to the back end region of the servo sector, and wherein the processor is configured to employ an adaptive formatting technique to account for effect of the skew angle in comparing the read/write separation gap with the size of the back end region for controlling the write element to start writing in the next data sector.

9. A method of performing a write operation for a disk drive which includes a disk including a plurality of tracks each having a plurality of data sectors spaced by servo sectors, the disk configured to rotate in a circumferential direction of the tracks; and a magnetic head having a write element to write data to the tracks and a read element to read data from the tracks, the write element being disposed in front of the read element against the circumferential direction of rotation of the disk so that the write element goes over a location on a track before the read element; the method comprising:

controlling the write element of the magnetic head in a write operation to write data to the data sector of a track until an end of the data sector before reaching a front end of a servo sector following the end of the data sector;

controlling the read element of the magnetic head to read information in the servo sector needed for the write operation; and controlling the write element to start writing data in a next data sector following the servo sector after the write element reaches the next data sector and after the read element has read all information in the servo sector needed for the write operation;

wherein the write element is separated from the read element by a read/write separation gap;

wherein a write to read recovery is needed for disturbance to decay due to switching from write mode to read mode before the read element starts reading information in the servo sector after the write element stops writing in the data sector;

wherein the write to read recovery is larger than the read/write separation gap by a recovery difference; and wherein the method further comprises controlling the write element to stop writing before reaching the end of the data sector by a space from the end of the data sector which is equal to or larger than the recovery difference so as to allow time for disturbance to decay due to switching from write mode to read mode.

10. The method of claim 9,
wherein the write element is separated from the read element by a read/write separation gap;
wherein a write to read recovery is needed for disturbance to decay due to switching from write mode to read mode before the read element starts reading information in the servo sector after the write element stops writing in the data sector;
wherein the write to read recovery is equal to or smaller than the read/write separation gap to allow time for disturbance to decay due to switching from write mode to read mode so as to provide write to read recovery;
wherein the magnetic head is disposed at a skew angle with respect to a tangent of the track so that the read/write separation gap is disposed at the skew angle with respect to the tangent of the track; and
wherein the method further comprises employing an adaptive formatting technique to account for effect of the skew angle in ensuring that the write to read recovery is equal to or smaller than the read/write separation gap.

11. The method of claim 9 wherein the magnetic head is disposed at a skew angle with respect to a tangent of the track so that the read/write separation gap is disposed at the skew angle with respect to the tangent of the track, and wherein the method further comprises employing an adaptive formatting technique to account for effect of the skew angle in comparing the read/write separation gap with the write to read recovery in controlling the write element to stop writing in the data sector to allow time for disturbance to decay due to switching from write mode to read mode.

12. The method of claim 9 further comprising arranging servo information in the servo sector such that information that is not needed for write operation is placed at a back end region of the servo sector.

13. The method of claim 12 wherein the information that is not needed for write operation includes one or more of cylinder address bit(s), read repeatable runout field, and part of a fine position tracking signal not necessary for write operation.

14. The method of claim 12 wherein,
if a size of the back end region is equal to or larger than the read/write separation gap, then the method further comprises controlling the write element to start writing in the next data sector substantially immediately after going over the back end of the servo sector so as to eliminate delay due to the read/write separation gap; and
if a size of the back end region is smaller than the read/write separation gap, then the method further comprises controlling the write element to start writing in the next data sector substantially immediately after the read element enters the back end region so as to reduce delay due to the read/write separation gap by an amount equal to the size of the back end region.

15. The method of claim 14 wherein the magnetic head is disposed at a skew angle with respect to a tangent of the track so that the read/write separation gap is disposed at the skew angle with respect to the back end region of the servo sector, and wherein the method further comprises employing an adaptive formatting technique to account for effect of the skew angle in comparing the read/write separation gap with the size of the back end region for controlling the write element to start writing in the next data sector.

16. A computer readable storage medium including a computer code for operating a disk drive which includes a disk including a plurality of tracks each having a plurality of data sectors spaced by servo sectors, the disk configured to rotate in a circumferential direction of the tracks; and a magnetic head having a write element to write data to the tracks and a read element to read data from the tracks, the write element being disposed in front of the read element against the circumferential direction of rotation of the disk so that the write element goes over a location on a track before the read element; the computer code comprising:
code for controlling the write element of the magnetic head in a write operation to write data to the data sector of a track until an end of the data sector before reaching a front end of a servo sector following the end of the data sector;
code for controlling the read element of the magnetic head to read information in the servo sector needed for the write operation; and
code for controlling the write element to start writing data in a next data sector following the servo sector after the write element reaches the next data sector and after the read element has read all information in the servo sector needed for the write operation;
wherein the write element is separated from the read element by a read/write separation gap;
wherein a write to read recovery is needed for disturbance to decay due to switching from write mode to read mode before the read element starts reading information in the servo sector after the write element stops writing in the data sector;
wherein the write to read recovery is larger than the read/write separation gap by a recovery difference; and
wherein the computer code further comprises code for controlling the write element to stop writing before reaching the end of the data sector by a space from the end of the data sector which is equal to or larger than the recovery difference so as to allow time for disturbance to decay due to switching from write mode to read mode.

17. The computer readable storage medium of claim 16,
wherein the write element is separated from the read element by a read/write separation gap;
wherein a write to read recovery is needed for disturbance to decay due to switching from write mode to read mode before the read element starts reading information in the servo sector after the write element stops writing in the data sector;
wherein the write to read recovery is equal to or smaller than the read/write separation gap to allow time for disturbance to decay due to switching from write mode to read mode so as to provide write to read recovery;
wherein the magnetic head is disposed at a skew angle with respect to a tangent of the track so that the read/write separation gap is disposed at the skew angle with respect to the tangent of the track; and
wherein the computer code further comprises code for employing an adaptive formatting technique to account for effect of the skew angle in ensuring that the write to read recovery is equal to or smaller than the read/write separation gap.

18. The computer readable storage medium of claim 16 wherein the magnetic head is disposed at a skew angle with respect to a tangent of the track so that the read/write separation gap is disposed at the skew angle with respect to the tangent of the track, and wherein the computer program further comprises code for employing an adaptive formatting technique to account for effect of the skew angle in comparing the read/write separation gap with the write to read recovery in controlling the write element to stop writing in the data sector to allow time for disturbance to decay due to switching from write mode to read mode.

19. The computer readable storage medium of claim 16 further comprising code for arranging servo information in the servo sector such that information that is not needed for write operation is placed at a back end region of the servo sector.

20. The computer readable storage medium of claim 19 wherein,
if a size of the back end region is equal to or larger than the read/write separation gap, and wherein the computer code further comprises code for controlling the write element to start writing in the next data sector substantially immediately after going over the back end of the servo sector so as to eliminate delay due to the read/write separation gap; and
if a size of the back end region is smaller than the read/write separation gap, and wherein the computer code further comprises code for controlling the write element to start writing in the next data sector substantially immediately after the read element enters the back end region so as to reduce delay due to the read/write separation gap by an amount equal to the size of the back end region.

21. The computer readable storage medium of claim 20 wherein the magnetic head is disposed at a skew angle with respect to a tangent of the track so that the read/write separation gap is disposed at the skew angle with respect to the back end region of the servo sector, and wherein the computer code further comprises code for employing an adaptive formatting technique to account for effect of the skew angle in comparing the read/write separation gap with the size of the back end region for controlling the write element to start writing in the next data sector.

22. The computer readable storage medium of claim 19 wherein the information that is not needed for write operation includes one or more of cylinder address bit(s), read repeatable runout field, and part of a fine position tracking signal not necessary for write operation.

* * * * *